United States Patent [19]
Chaum

[11] Patent Number: 4,996,711
[45] Date of Patent: Feb. 26, 1991

[54] SELECTED-EXPONENT SIGNATURE SYSTEMS

[76] Inventor: David L. Chaum, 14652 Sutton St., Sherman Oaks, Calif. 91403

[21] Appl. No.: 368,677

[22] Filed: Jun. 21, 1989

[51] Int. Cl.[5] .............................................. H04L 9/30
[52] U.S. Cl. .......................................... 380/30; 380/9; 380/23; 380/25; 380/49
[58] Field of Search ...................... 380/6, 9, 24, 28, 30, 380/44, 23, 25, 49, 50

[56] References Cited
U.S. PATENT DOCUMENTS

| | | | |
|---|---|---|---|
| 4,200,770 | 4/1980 | Hellman et al. | 380/30 |
| 4,218,582 | 8/1980 | Hellman et al. | 380/30 |
| 4,351,982 | 9/1982 | Miller et al. | 380/30 |
| 4,405,829 | 9/1983 | Rivest et al. | 380/30 |
| 4,424,414 | 1/1984 | Hellman et al. | 380/30 |
| 4,458,109 | 7/1984 | Mueller-Schloer | 380/30 |
| 4,759,063 | 7/1988 | Chaum | 380/30 |
| 4,759,064 | 7/1988 | Chaum | 380/30 |

Primary Examiner—Stephen C. Buczinski
Assistant Examiner—Bernarr Earl Gregory
Attorney, Agent, or Firm—Nixon & Vanderhye

[57] ABSTRACT

Digital signature techniques are disclosed in which exponents may be selected by the message to be signed itself, by the signing party, by the party providing the message to the signing party for signature, and/or by a party to whom the signature is shown. When a message selects the exponent(s), the need for "hash functions" in known signature schemes is overcome. When the exponent is chosen by the party receiving the signature, to take another example, computation, storage and bandwidth requirements of known one-show blind signature systems may be improved. Also, the bank cannot falsely incriminate a payer for showing a signature more than once, even if the bank has unlimited computing resources.

15 Claims, 12 Drawing Sheets

P                                                    B

101
$i \in \{1,...,s\}$
$r_i, a_i, r'_i, z, r = \text{random}$
$[11.1]_i \to B: r_i^c f(a_i)$
$[11.2]_i \to B: r'_i{}^d f(a_i \oplus u)$
$q = h([11.1]_1,...,[11.1]_s,...,[11.2]_1,...,[11.2]_s)$
$p = q^z r^{dc}$
$[11.3] \to B: zg(p) \bmod dc$ 102
$v = \text{random}$
$[12] \; P \leftarrow : v$
$\text{GCD}([11.3], dc) \;?=? \; 1$ 103
$|[12]| \;?=? \; t$
$j \in \{1,...,s\} - [12]$
$[13.1]_j \to B: r_j$
$[13.2]_j \to B: a_j$
$[13.3]_j \to B: r'_j$ 104
$j \in \{1,...,s\} - v$
$[11.1]_j \;?=? \; [13.1]_j{}^c f([13.2]_j)$
$[11.2]_j \;?=? \; [13.3]_j{}^d f([13.2]_j \oplus u)$
$q' = h([11.1]_1,...,[11.1]_s,...,[11.2]_1,...,[11.2]_s)$
$k \in v$
$[14] \; P \leftarrow : q'^{[11.3]/dc} \prod [11.1]_k{}^{1/c(@k)} [11.2]_k{}^{1/d(@k)}$ 105
$k \in [12]$
$[14]^{dc} \;?=? \; q^{[11.3]} \prod [11.1]_k{}^{dc/c(@k)} [11.2]_k{}^{dc/d(@k)}$
$p' = q^{zg(p)} \text{ div } dc \, r^{g(p)} [14] / \prod r_k{}^{c/c(@k)} r'_k{}^{d/d(@k)}$
$a'@k = a_k$

FIG. 10a
```
1000
p"(x) := "first prime >": ⌈x³⌉
```
FIG. 10b
B                                         P
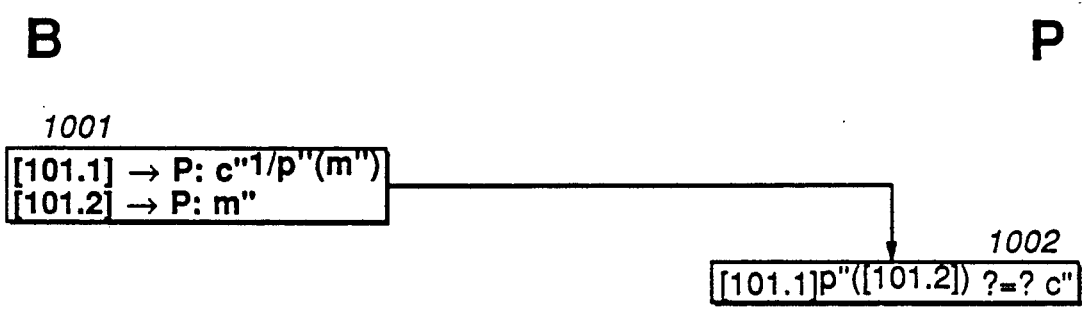
FIG. 11a
```
1100
i ∈ {1,...,k}
p'''(x,y) :=
Πp"("(2ky+i) if bit position i of x = 1")
Πp"("(2ky+k+i) if bit position i of x = 0")
```
FIG. 11b
B                                         P
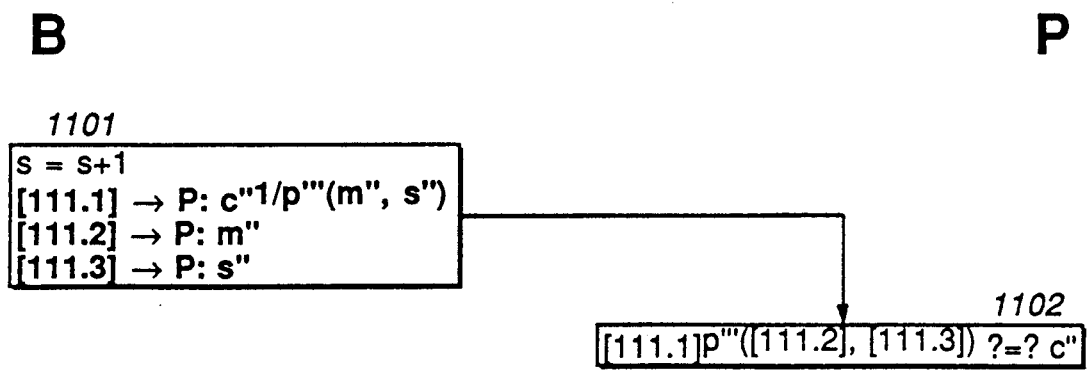

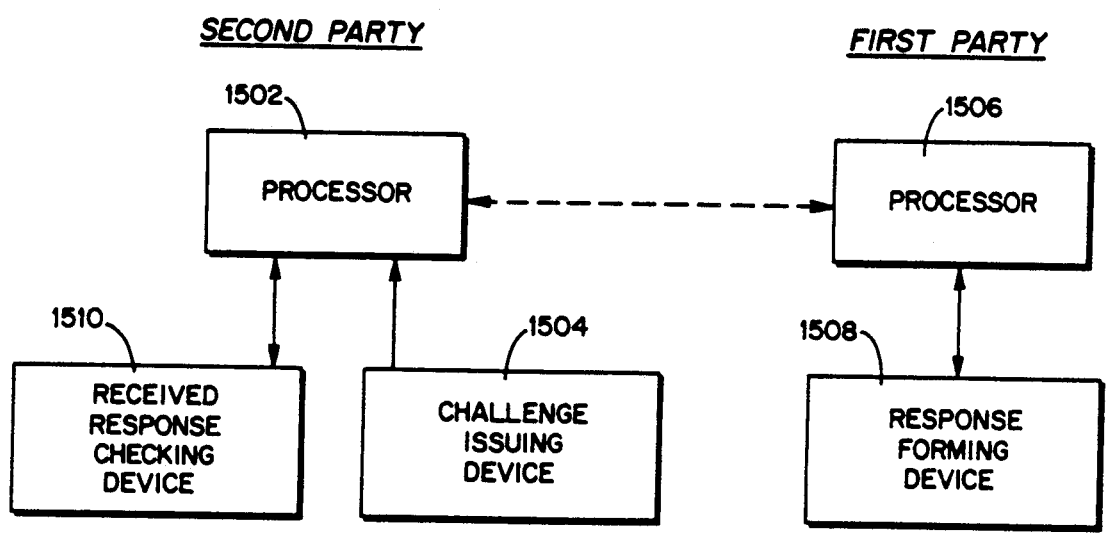

SELECTED-EXPONENT SIGNATURE SYSTEMS

BACKGROUND OF THE INVENTION

1. Field of the Invention.

This invention relates to improved cryptographic techniques for public-key digital signatures, and more specifically to such signatures achieving blind signatures and one-show signatures.

2. Description of Prior Art.

Known public key digital signatures based on RSA fix, at least for a large class of messages, the choice of public exponent. One problem with these systems is that they must employ a second cryptographic transformation, sometimes called a "hash function." Consequently, their security is forced to rely at least on the hash function, and thus not only on the difficulty of finding roots in the RSA system.

A somewhat more demanding use of digital signatures was disclosed in U.S. Pat. No. 4,759,063, titled "Blind Signature Systems," issued to the present applicant, also appearing as European Patent Publication No. 0139313 dated 2/5/85, and which is incorporated herein by reference. Such blind signatures were later extended, as described in the co-pending application of the present applicant, titled "One-Show Blind Signature Systems," filed 3/3/88, with U.S. Ser. No. 168,802, now abandoned, and also incorporated herein by reference. Still other related signatures were described in a co-pending application of the present applicant, titled "Unpredictable Blind Signature Systems," with U.S. filing date 5/4/89, U.S. Ser. No. 347,303, also incorporated herein by reference.

These one-show systems appear to have rather wide utility, but the amount of data which must be stored can be reduced, as can the amount of data communicated. The party showing such a signature might wish protection against false charges that the signature has improperly been shown more than once, particularly in the case where the accuser has substantial computing capabilities.

OBJECTS OF THE INVENTION

Accordingly, an object of the present invention is to remove the need for hash functions or other cryptographic functions in the construction of deterministic digital signatures.

Another object of the present invention is to provide a signature issuing procedure that depends on state maintained by the signer party and that uses exponents from a set only a constant factor larger than the set of messages signed.

A further object of the invention is to provide a blind signature that can select distinct public exponents for each signature.

Still another object of the invention is to encode information in the choice of exponents that can be revealed in the process of showing such a signature.

Yet a further object of the invention is to allow the party showing a signature to selectively determine what information is revealed by determining which secret exponents appear in the signature shown.

A still further object of the invention is to provide for paying any of plural amounts with a single signature and for receiving a refund for the unspent part of that signature, all such that the party making the payment cannot—except with exponentially small chance—both pay some part of a value and receive a refund for that same part.

Yet a further object of the invention is to give one party only an exponentially small chance (even if that party has unlimited computing resources) of convincingly claiming that a second party has entered into a subsequent transaction, when that second party has not.

Even further objects of the invention are to provide one-show signatures with reduced space, bandwidth, and/or time requirements.

Still another object of the present invention are to allow efficient, economical, and practical apparatus and methods fulfilling the other objects of the invention.

Other objects, features, and advantages of the present invention will be appreciated when the present description and appended claims are read in conjunction with the accompanying drawing figures.

BRIEF DESCRIPTION OF THE DRAWING FIGURES

FIGS. 10a and 10b shows a flowchart of a public key digital signature technique, in which a common operation (a) is employed by both parties in a deterministic signature issuing and checking protocol (b), all in accordance with the teachings of the present invention.

FIGS. 11a and 11b shows a flowchart of a public key digital signature technique, in which a common operation (a) is employed by both parties in a signature issuing and checking protocol (b) and in which the signature depends on the number of signatures previously issued by the signer, all in accordance with the teachings of the present invention.

Figure 12:
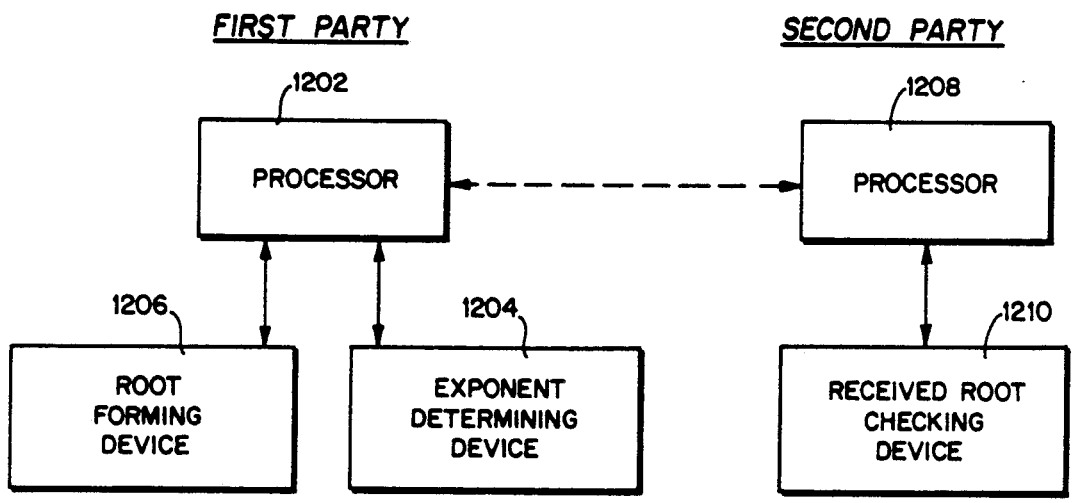
Figure 13:
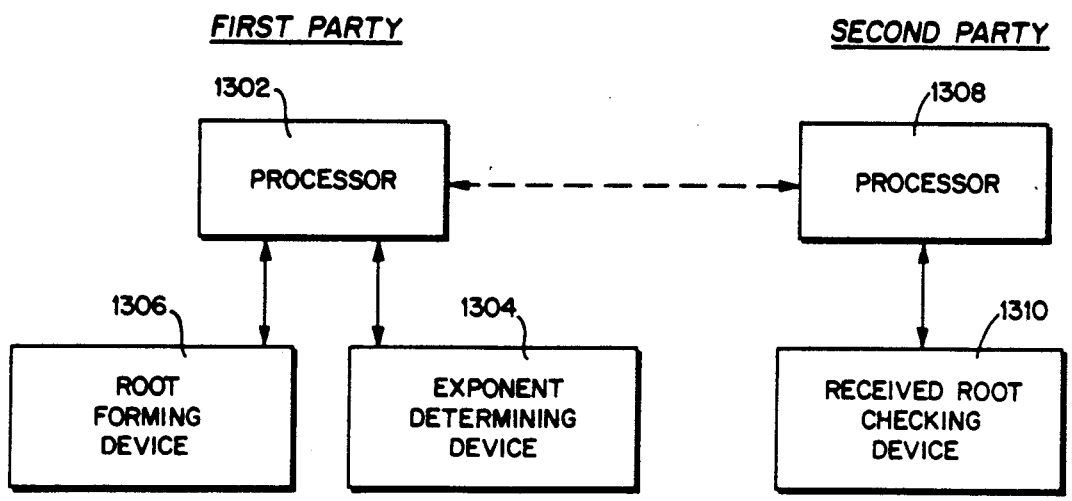

FIGS. 12–14 symbolically depict apparatus for practicing the exemplary methods of this invention.

BRIEF SUMMARY OF THE INVENTION

In accordance with these and other objects of the present invention, a brief summary of some exemplary embodiments is presented. Simplifications and omissions may be made in the following summary, which is intended to highlight and introduce some aspects of the present invention, but not to limit its scope. Detailed descriptions of preferred exemplary embodiments adequate to allow those of ordinary skill in the art to make and use the inventive concepts are provided later.

The simplest signature technique disclosed (FIGS. 10a and 10b) associates a distinct prime with each distinct message to be signed. Then an agreed and fixed public constant is raised to a power modulo an agreed and fixed composite. The factorization of the composite is assumed known only to the signer, and the power is the multiplicative inverse of the prime modulo the order of the multiplicative group of residue classes modulo the composite. Thus, to check the signature, anyone can compute the prime from the original message using a public and agreed procedure, raise the signature to that prime power modulo the public modulus, and verify that the result is indeed the fixed public constant.

A second disclosed signature scheme (FIGS. 11a and 11b) is similar, but the signer keeps count of the number of signatures issued. The serial number of a signature determines a vector of primes that are each distinct from those determined by other serial numbers. The message to be signed is treated as a binary string, and it and its complement are concatenated together, forming a string having twice the length of the original message string. The vector of primes has the same length as this expanded message string, and each prime is considered to correspond to a bit position in the expanded message. A product is formed of all primes in the vector selected by corresponding 1 bits in the expanded message. This product serves as the public exponent that can be used as in the simple scheme just described.

Figure 8:
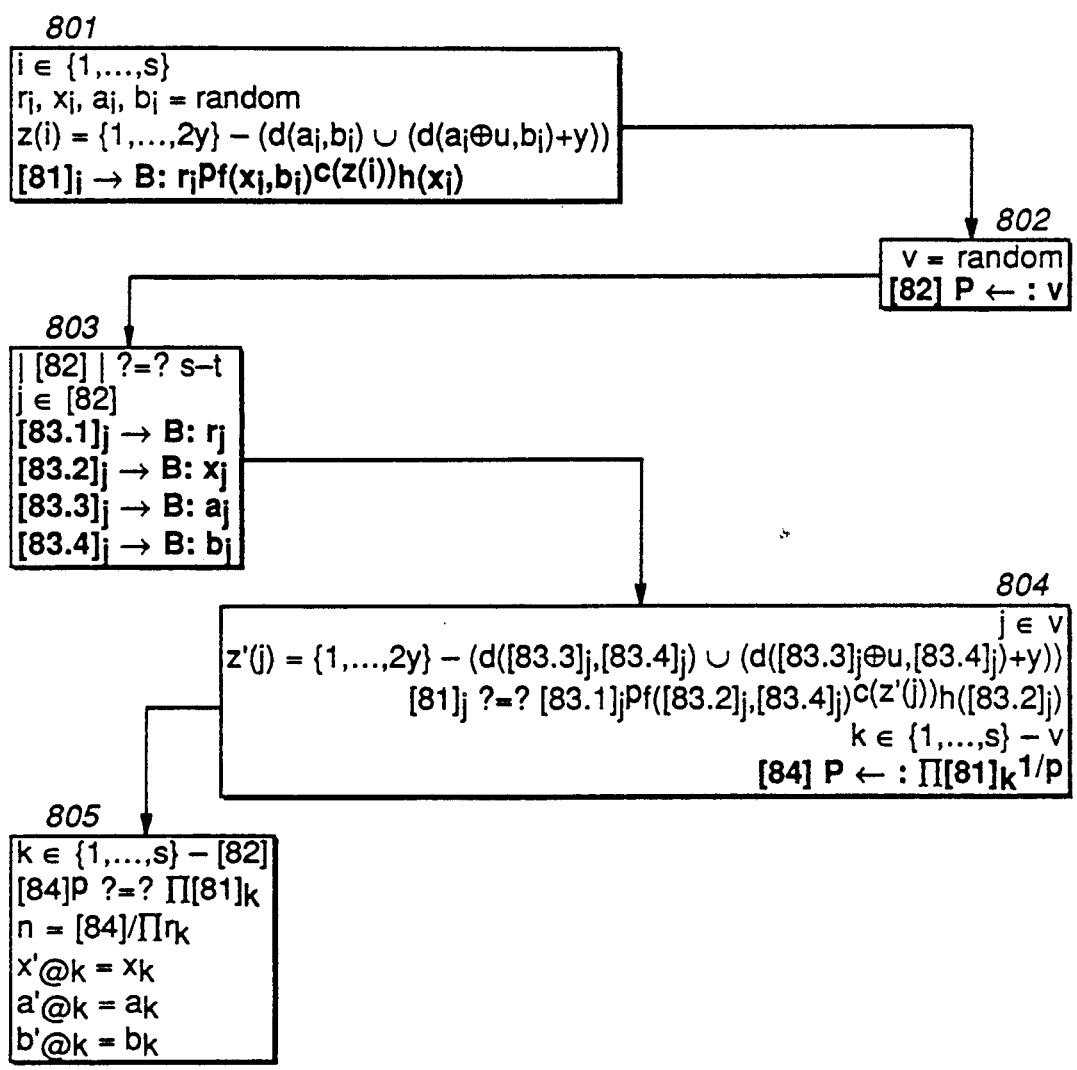
FIG. 8 shows a flowchart of an alternate preferred embodiment of a withdrawal transaction protocol for issuing a one-show signature in accordance with the teachings of the present invention.
Figure 9:
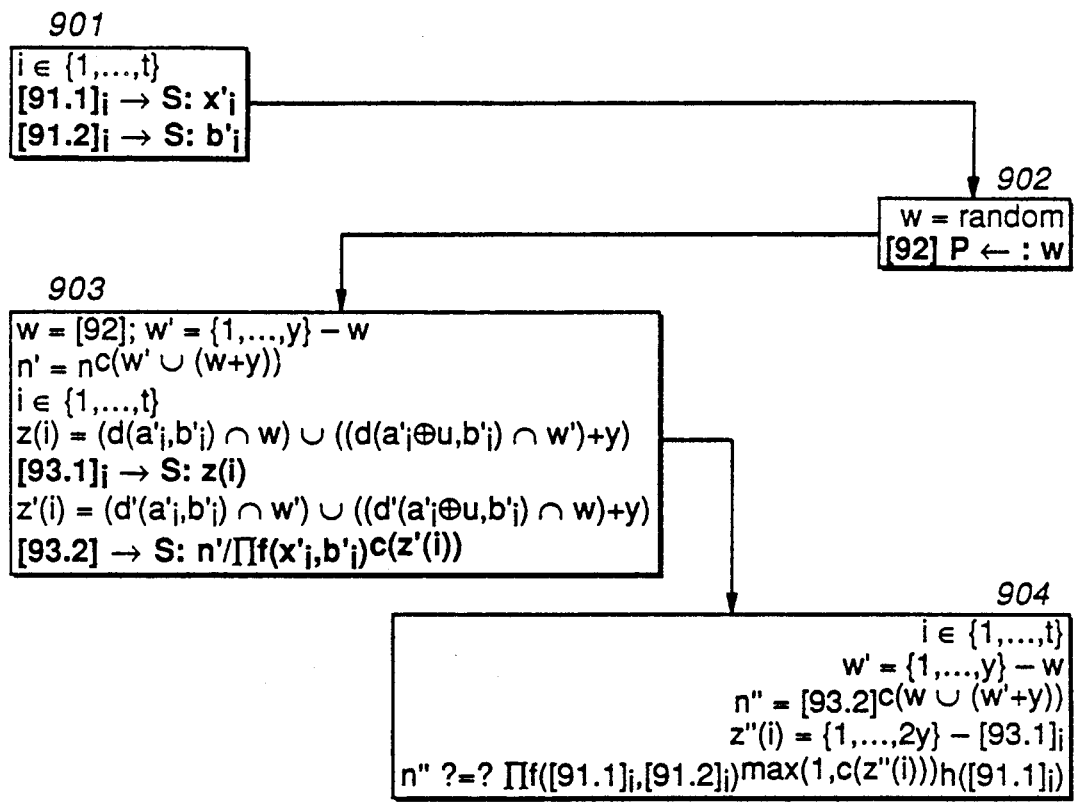
FIG. 9 shows a flowchart of an alternate preferred embodiment of a value-transfer transaction protocol allowing a first party to show a one-show signature to a second party in accordance with the teachings of the present invention.

A one-show blind signature technique is described in FIGS. 8 and 9. Unlike known schemes, a distinct prime is associated with each bit of the essential content of the resulting signature. During withdrawal, because of the "cut-and-choose" technique employed, roots corresponding to only some of these primes are obtained by the payer making the withdrawal, but the bank is unable to learn which particular roots the payer obtains. Thus a blind signature is formed in which the message content is encoded by the subset of roots obtained. When the payer shows the signature to a shop, only a part of the roots held by the payer are revealed, the part being selected by the shop's challenge.

Figure 1:
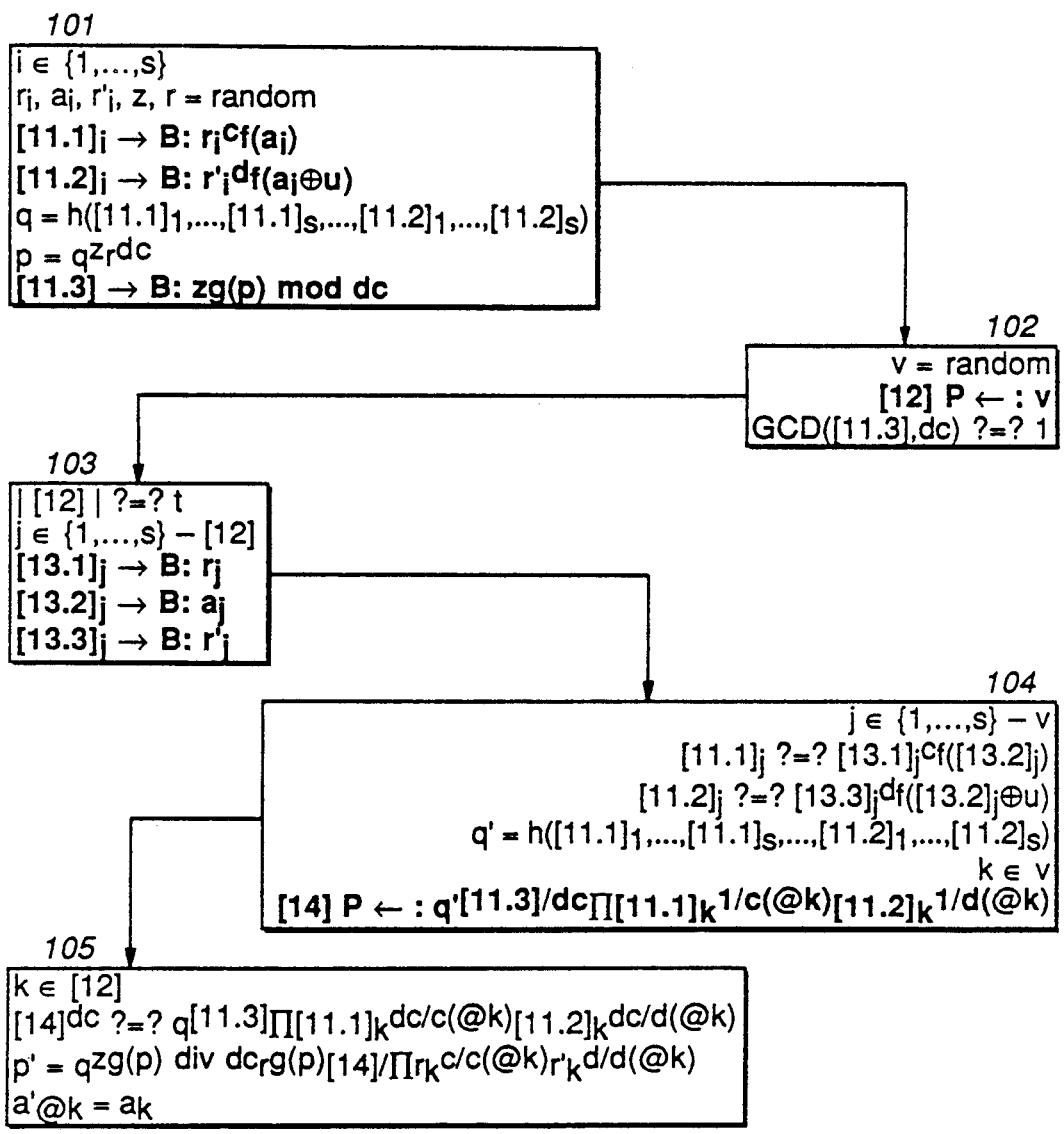
FIG. 1 shows a flowchart of a preferred embodiment of a withdrawal transaction protocol for a first party issuing a one-show signature to a second party in accordance with the teachings of the present invention.
Figure 2:
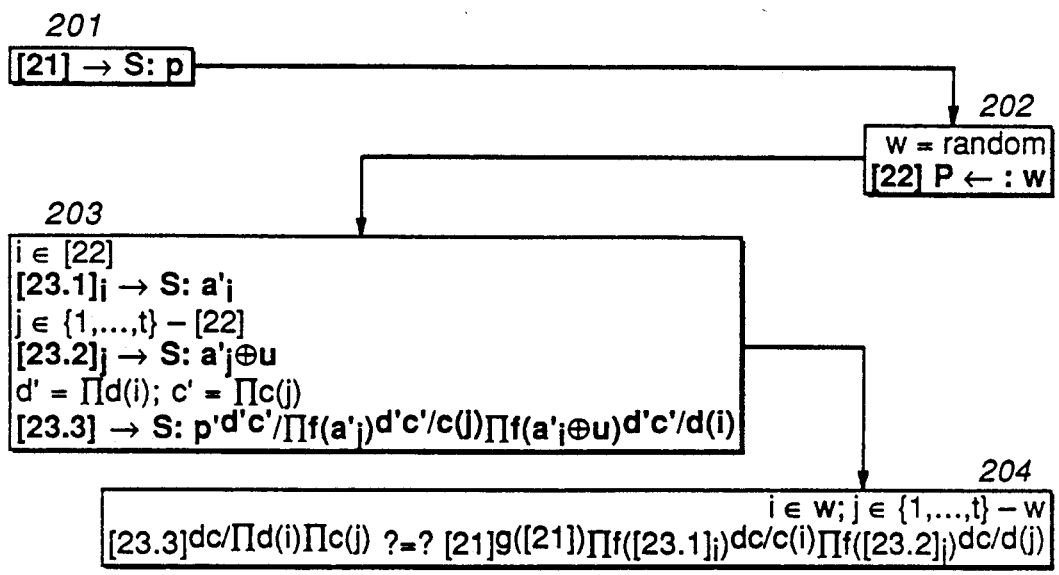
FIG. 2 shows a flowchart of a preferred embodiment of a value-transfer transaction protocol allowing a first party to show a one-show signature to a second party in accordance with the teachings of the present invention.

Another one-show blind signature protocol is presented in FIGS. 1 and 2. Unlike FIGS. 8 and 9, the payer receives the full set of roots during withdrawal. But during payment, again only those roots selected by the challenge are shown. Reference should be made here to the already mentioned co-pending application titled "Unpredictable Blind Signature Systems."

Figure 3:
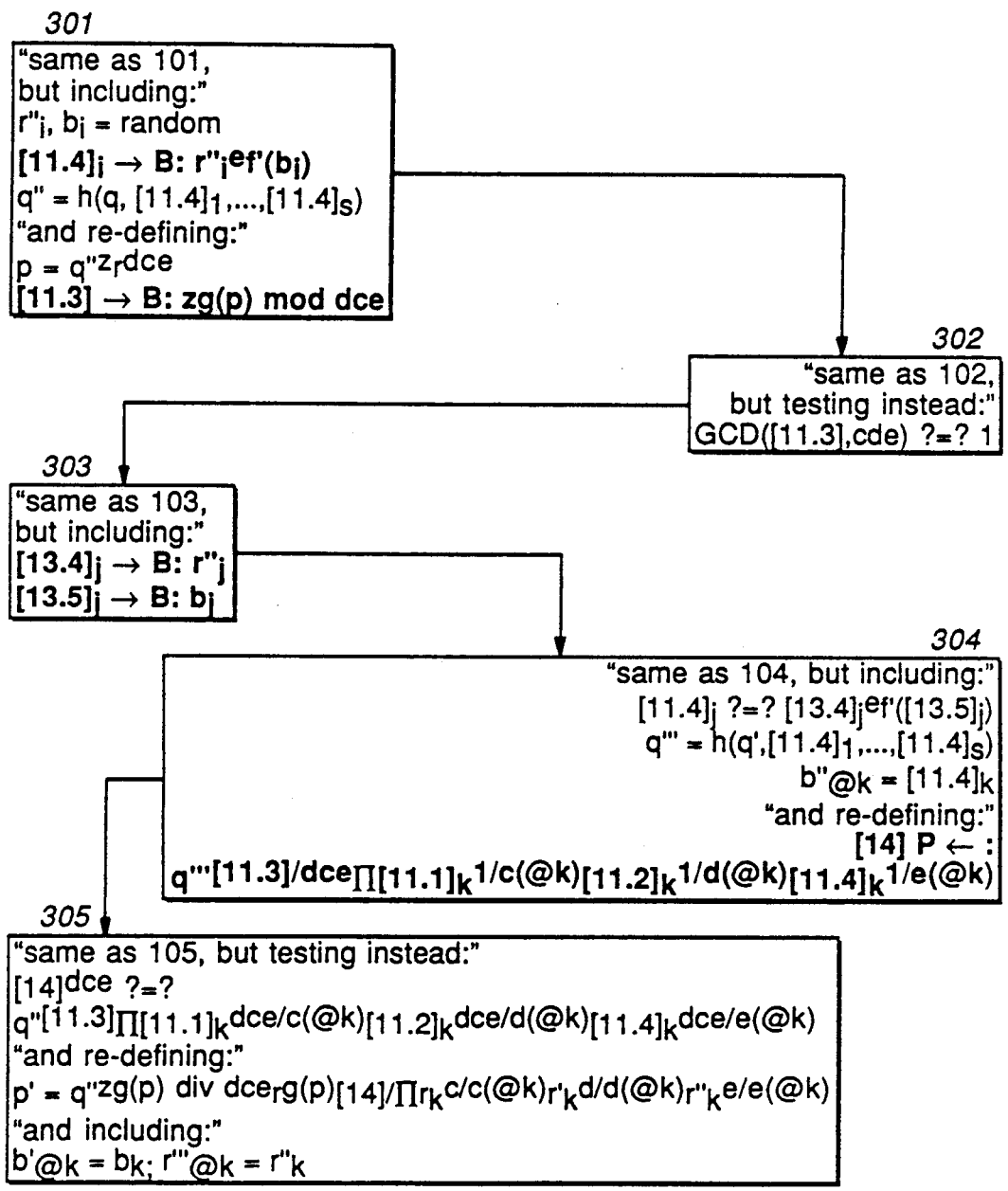
FIG. 3 shows a flowchart of a preferred embodiment of a withdrawal transaction protocol based on modifications to FIG. 1 and incorporating plural amounts of value in accordance with the teachings of the present invention.
Figure 4:
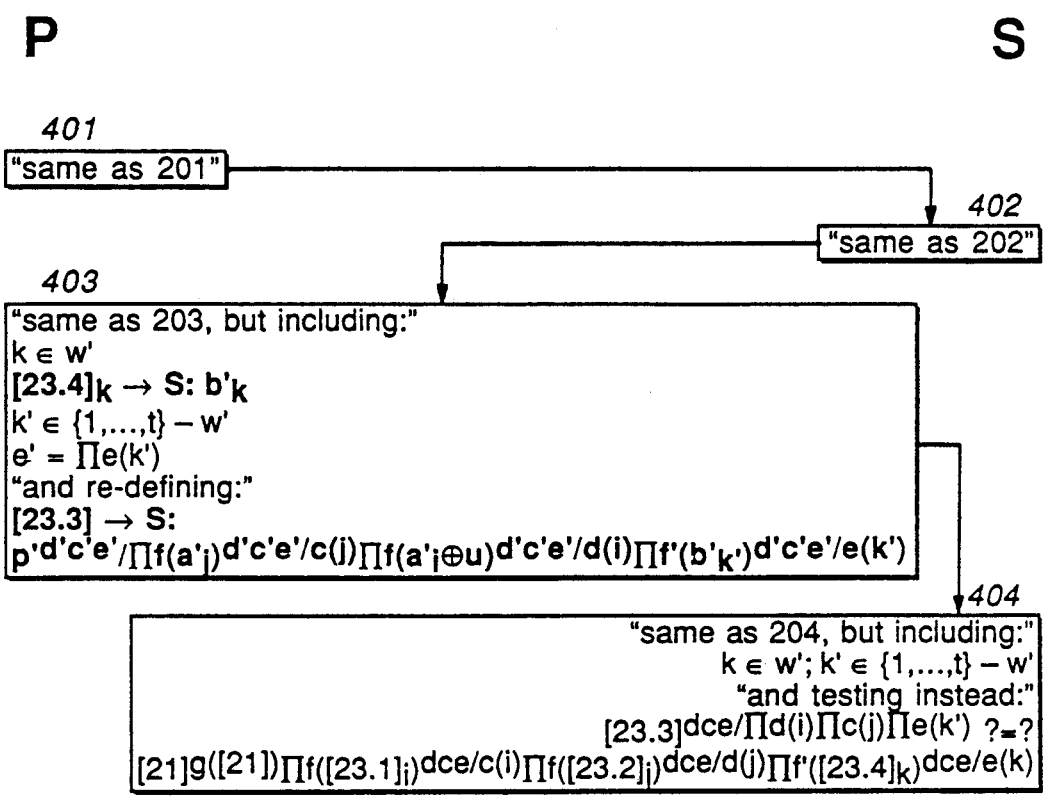
FIG. 4 shows a flowchart of a preferred embodiment of a value-transfer transaction protocol based on modifications to FIG. 2 allowing any of plural amounts of value to be selected and transferred, all in accordance with the teachings of the present invention.

The techniques of FIGS. 1 and 2 are extended by those of FIGS. 3 and 4, respectively. So-called "minor terms" are included that each correspond to a fixed denomination of value. When a signature issued in FIG. 3 is spent in an instance of FIG. 4, some of these minor terms are revealed, corresponding to the amount of payment. Later, an instance of FIG. 5 can be conducted in which the payer receives "credit," i.e. any appropriate form of compensation, for those minor terms not revealed in the payment. This refund is accomplished by the payer demonstrating knowledge of roots of the so-called "blinding factors" that are present in the blinded forms of the minor terms—but without the payer revealing which blinding factor was in which minor term.

Figure 6:
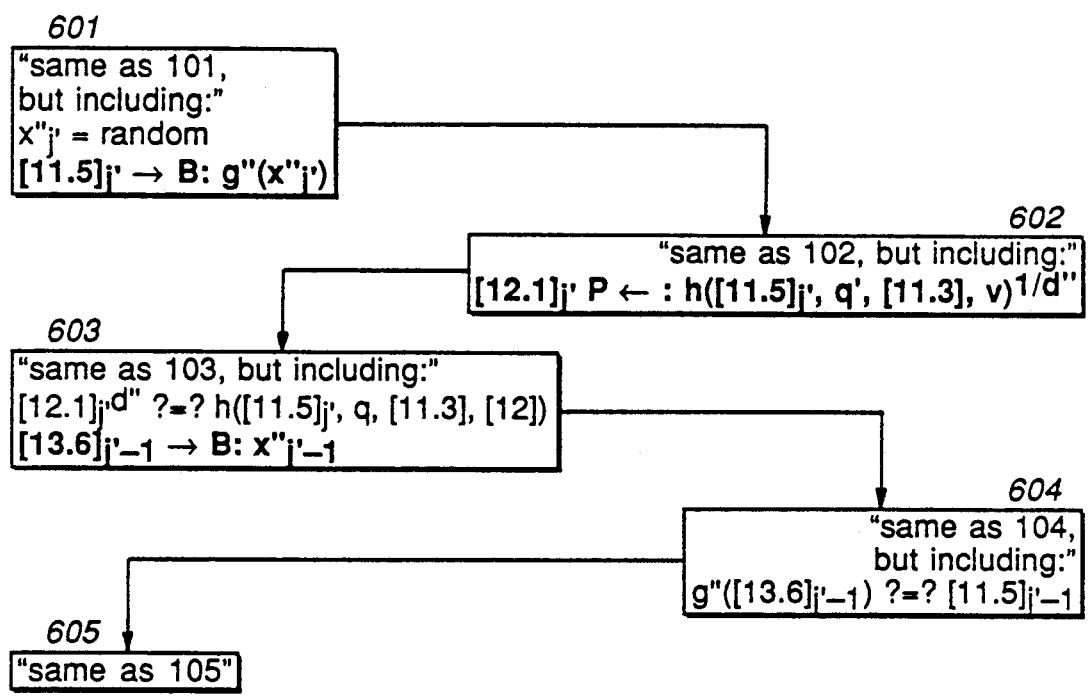
FIG. 6 shows a flowchart of a preferred embodiment of a withdrawal transaction protocol based on modifications to FIG. 1 giving the withdrawing party a signature on the transactions details of all signatures which that party cannot later successfully disavow, all in accordance with the teachings of the present invention.

If a payer receives from the bank a signature on all details of every withdrawal that the payer may be responsible for, then the payer is protected against false incrimination by the bank; even thought the bank could manufacture and spend repeatedly a signature containing the payer's account identifier, the payer could always reveal roots of blinding factors that would prove such a check to be bogus. In FIG. 6 a general technique is given that allows the payer to be sure to have a signature on each such withdrawal and which prevents the bank from being able to falsely claim that a subsequent withdrawal has taken place. Even infinite computing resources cannot help the bank falsely incriminate, because insufficient information is disclosed to allow the bank to determine which secret values are held by the payer, and if two values satisfying the public information were to become known, then at least part of the bank's cryptosystem would be shown to have been compromised.

Figure 7:
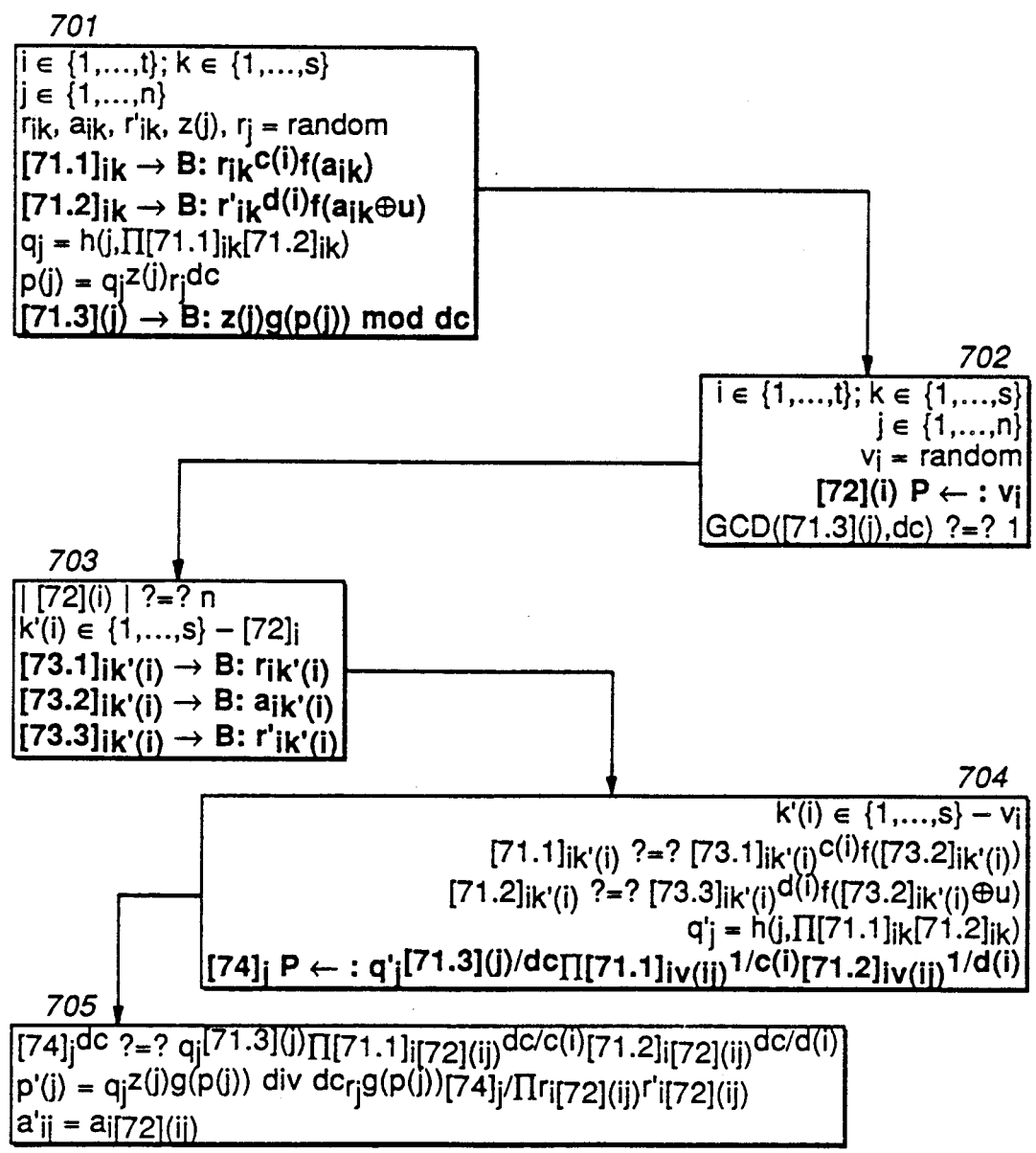
FIG. 7 shows a flowchart of a preferred embodiment of a withdrawal transaction protocol for a first party to issue a second party multiple one-show signatures, in accordance with the teachings of the present invention.

Finally FIG. 7 shows how the effect of multiple instances of FIG. 1 can be achieved in a single transaction, thereby yielding substantial economy. Many "candidate" factors are provided by the payer, and the bank demands to see how some were formed and divides the others into checks. It is believed that this technique not only reduces the amount of computation needed to form each candidate, but also reduces the number of candidates that need be shown in FIG. 2.

DETAILED DESCRIPTION OF PREFERRED EMBODIMENTS

While it is believed that the notation of FIGS. 1–6 would be clear to those of ordinary skill in the art, it is first reviewed here for definiteness.

It will be understood by those in the art that the flowcharts depicted in the Figures are symbolic representations of both method and apparatus for implementing this invention. The depicted blocks may be realized, for example, by conventional general purpose data processing hardware programmed to perform the depicted data processing steps. Alternatively, one may use special purpose data processing hardware using conventional hardware design methods to devise circuits to perform the depicted data processing steps. The depicted interconnecting lines may be realized by conventional data communication methods, devices and circuits.

The operations performed are grouped together into flowchart boxes. The column that a box is in indicates which party performs the operations defined in that box. The columns are labeled by party name across the top: "P" for provider, "S" for signature checker, and "B" for blind signature issuer. Alternatively, these may be read as payer, shop, and bank, respectively.

One kind of operation is an equality test. The "?=?" symbol is used to indicate such a test, and the party conducting the test terminates the protocol if the equality does not hold. (If the test is the last operation to be performed by a party during a protocol, then the success or failure of the test determines the party's success or failure with the protocol.)

Another kind of operation is that of sending a message. This is shown by a message number on the left; followed by a recipient name and an arrow (these appear for readability as either a recipient name then left pointing arrow, when the recipient is on the left; or right pointing arrow then recipient name, when the recipient is on the right); followed by a colon; finally followed by an expression denoting the actual value of the message that should be sent, shown using variables whose values are known to the sender. (These operations are depicted in a "bold" typeface for clarity.) Square brackets are used to delimit message numbers. Messages may be distinguished by subscripts, which will be described later, and are shown outside the brackets.

The further operation of saving a value under a symbolic name is denoted by the symbolic name on the left-hand side of an equal sign and an expression on the right-hand side. These and other operations may be delimited by being shown on separate lines as well as by semicolons ";" dividing a single line; other operations occupy multiple lines.

Several kinds of expressions are used. One is just the word "random." This indicates that a value is preferably chosen uniformly from an appropriate set of values defined in the text and independently of everything else in the protocol. Thus a party should preferably employ a physical random number generator for these purposes, possibly with appropriate post-processing. In practice, however, well known keyed and unkeyed cryptographic and pseudo-random techniques may be applied, possibly in combination with physical sources.

A further kind of expression involves exponentiation. All such exponentiation is in a finite group, say, for example, the multiplicative group modulo a composite modulus m. When no operation is shown explicity, multiplication in such a group is assumed. When "/" is applied between elements of such a group, the result can be calculated by first computing the multiplicative inverse of the expression on the right and then multiplying it by the expression on the left—this operation may also be described simply as division. When the "/" is used between exponents, and if the result is a proper fraction, it indicates a corresponding root, as is well known in the art.

Suitable moduli have been proposed in "A method for obtaining digital signatures and public-key cryptosystems," by Rivest, Shamir and Adleman, Communications of the ACM, Feb. 1978, pp. 120–126. For simplicity, concreteness, and clarity, and without loss of generality, all elements subject to exponentiation will be taken to be residues modulo the RSA modulus m of party B, unless mentioned otherwise. The public exponents of party B used in all the figures are taken for simplicity to be, as is common practice in the art, coprime with the order of the multiplicative group used in the exponentiation.

Figure 5:
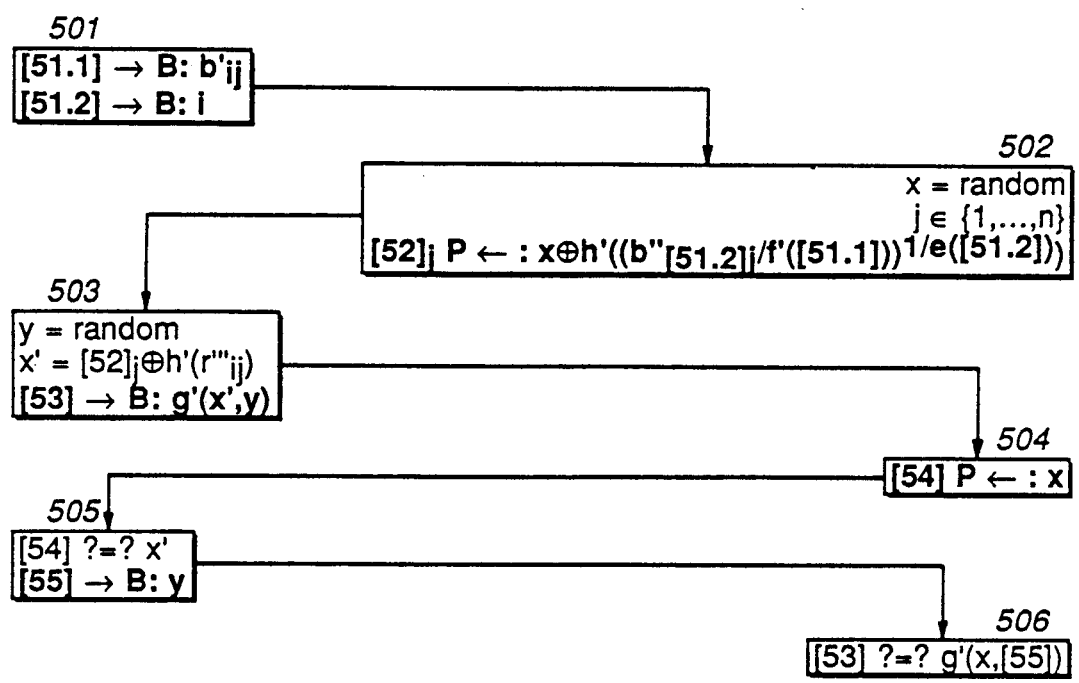
FIG. 5 shows a flowchart of a preferred embodiment of a refund transaction protocol allowing a party to obtain credit for any of plural amounts of value not previously transferred, in accordance with the teachings of the present invention.

In particular, the public exponents of FIGS. 1–6 are are $d(i)$ and $c(i)$, with the product of the $d(i)$ being shown as d and that of the $c(i)$ as c. In FIGS. 3–5, further exponents $e(j)$ are included, whose product is taken as e. It will readily be appreciated by those of skill in the art how additional factors could be included in c,d, and e to increase the number of coprime residues to protect against a valid signature being guessed.

The "mod" operation is shown explicitly when it is called for in calculations involving exponents. Also the "div" operation is used, which may be thought of as the integer remainder when the value on the left side is divided by that on the right.

The functions $f, f', h$ are public one-way functions whose images are elements of the multiplicative group modulo m. The functions are taken to be "collision free" in the usual sense that it is believed at least computationally difficult to find multiple pre-images that result in the same image. Since the first two may have rather limited input domains, say, for example, on the order of 32 or 128 bits respectively, they can be made in effect collision free by being made injective. As would be obvious to those of skill in the art, it should be difficult to find any structure in these functions that can be related to the group or field structure of their images.

Another public one-way function notation used is g. In some embodiments, g can have an output limited to the natural numbers less than and coprime with the public exponent used, as in the co-pending "unpredictable blind signatures" application already mentioned.

Yet another function used is $g'$. Its first argument is preferably perfectly hidden by the second. Notice that any function of such a function also has this property. This sort of function has been used in the co-pending application titled "One-show blind signature systems" already mentioned.

Still another function used is $h'$. Its single argument is crptographicaly compressed to a preferably smaller range of possible values. An example is the so called "hard bit" functions widely known in the art that compress a residue modulo m to a single bit. Other compressions could be less severe, having images requiring on the order of 2 to 32 bits, for example.

A further type of expression involves particular well known operations. One example is the infix binary operator $\oplus$, which may be taken as the bit-wise exclusive-or operator on the binary string representation of its two arguments. Any other suitable group operation could of course also be used. Another example is the well known GCD operation, which returns the greatest common divisor of its two arguments.

Another type of expression used in the exemplary embodiments relates to ordered sets of integers without multiplicities. For example, $\{1, \ldots, t\}$ denotes the set of integers from 1 to t inclusive in increasing order. Such sets may be combined with "−", the usual set difference operation, where the resulting order is fixed by some convention. The cardinality, or number of elements in a set, is denoted by enclosing an expression for the set within vertical bars "|". The set membership symbol "$\epsilon$" is used to define an index variable that runs over all the values in a set; thus, computations and messages involving an index variable are repeated for each value it takes on. In particular, the well known "$\pi$" notation is used to indicate that the product is formed of all values induced in the expression on the right by the different values of the index variable used in that expression, as will also be described.

Elements within a set are indexed by their position. For instance, consider the set $w = \{9, 5, 7\}$ and $j \epsilon w$, then w(1) is 9, w(2) is 5, and w(3) is 7. The @ operator is used to indicate the position of the value of an index variable within the index set it ranges over. For instance, when j=9 then @j=1, and when j=5, @j=2. Double subscripting is indicated, for clarity, without a comma separating the subscripts. Indexing in general is shown either using subscript notation or with the index in parenthesis. An effort has been made, though, to be consistent in this choice for each variable. As will be appreciated, the parenthesis notation has been used for those messages and variables appearing in the superscript or subscript positions.

Turning now to FIG. 1, the first part of a flowchart for the preferred embodiment will now be described in detail. It may be thought of as a withdrawal transaction, in which party P withdraws a certain amount of value from party B.

Box 101 shows party P first choosing $r_i, a_i, r'_i$, independently and uniformly at random, such random selection as already mentioned above. For each value of i, which is shown ranging from 1 to s, a separate random choice is made for each of the three. All the values are chosen from the residues modulo the modulus m already mentioned. Another value shown chosen from the same distribution is r. A final value chosen at random is z, which is believed preferably taken from the integers between 1 and dc that are coprime with dc.

Next P forms s messages $[11.1]_1$ through $[11.1]_s$. The i'th such message is formed as a product of $r_i$ raised to the c power times the image under f of $a_i$. Each of these messages is sent by P to B. Similarly, s messages $[11.2]_i$ are formed as $r'_i$ raised to the d power, the quantity times an image under f. The argument for f is $a_i$ exclusive-or'ed with a quantity u. It is expected that u will be known to both P and B. In some embodiments u would serve to identify P or an account that P is associated with. It also may be that u is not constant but varies for each message, such as by being concatenated with a message counter or the like. Again, each of these messages is sent by P to B.

Another operation of this box is to compute the value q. As will be appreciated, such a value could also be chosen by B, but the embodiment shown here at least has the virtue of allowing pre-computation by P before communication with B. The hashing function h is applied to all 2s messages just described and the resulting residue modulo m is taken as q. The value p is next shown being computed as the product of q raised to the z power, the quantity times r raised to the dc power.

The last operation in this box is the sending of message [11.3] from P to B. Its value is a first number reduced modulo the value dc. This first number is the product of z and the function g applied to the value p just described.

Box 102 indicates that, after receiving message $[11.1]_i$, $[11.2]_i$, and [11.3] for all i between 1 and s, B creates a random index set v of integers such that it contains t elements and the elements are chosen uniformly as integers between 1 and s. Then B sends this set v to P as message [12]. An additional check made by B is that the greatest common divisor, GCD, of message [11.3] and dc is 1; in other words that the two values are coprime.

Box 103 describes first how this set received as message [12] by P is tested by P to ensure that its cardinality is exactly t. Then the variable j is allowed to range over the elements not in the set [12], in other words, j ranges over the complement of [12] with respect to the universal set containing the integers between 1 and s. For each value of j, P sends B $r_j$ as $[13.1]_j$, $a_j$ as $[13.2]_j$, and $r'_j$ as $[13.3]_j$.

Box 104 first illustrates the setting of an index variable j to range over all values in the set v already mentioned in box 102. For each value of j, the construction of messages $[11.1]_j$ and $[11.2]_j$ already received is tested by re-computing their values from message $[13.1]_j$, $[13.2]_j$, and $[13.3]_j$ received. The first, $[11.1]_j$, is tested for equality with the product of $[13.1]_j$ raised to the c, the quantity times the image under f of $[13.2]_j$. The second, $[11.2]_j$, is tested for equality with the product of $[13.3]_j$ raised to the d, the quantity times the image under f of $[13.2]_j$ exclusive-or'ed with the value u already mentioned.

The value q' is computed, just as it was in box 101 under the variable name q, by applying the hashing function h to all the messages [11.1] and [11.2] in the same order as used in box 101.

The index variable k is allowed to range over the set v mentioned in box 102. The message [14] is computed and sent to B. Its value is a product of two factors. The first q' raised to a power that is calculated as message [11.3] divided by dc. The second factor is a product ranging over all values of k. One factor in the product is message $[11.1]_k$ raised to a power. This power is the reciprocal of the element c(i), where i is the current index of k in v, which as already mentioned is denoted @k. The second factor in the signature is message $[11.2]_k$ raised to the 1 over d(@k).

Box 105 depicts first the same same setting of index variable k to range over the complement of the set contained in message [12] received in box 103 above. Then equality is tested between received message [14] raised to the power cd,q raised to the [11.3], and a product over k. The first of two factors in this product is message $[11.1]_k$, the quantity raised to the dc over c(@k); the second is $[11.2]_k$ to the dc over d(@k).

Next p is computed by multiplying certain factors into, and dividing others out of, message [14] received. The first factor put in is q raised to a power that is the result of a div operation, as already described. The left of the div is the product of z times g applied to p, and the right side is the product dc. The second and final factor included is r raised to the image of p under g. A product over all k of two factors is taken out. The first of the two factors is $r_k$ raised to the c over c(@k). The other factor is $r'_k$ raised to the d over d(@k).

Finally, a variable is re-indexed for notational clarity and also possibly to save storage. The variable a' with subscript @k is given the value $a_k$; in other words, only those values of a that were not revealed in box 103 need be retained, and they can be stored under the index set 1 to t that corresponds to the exponents they have in p'.

Turning now to FIG. 2, the second flowchart for part of the preferred embodiment will now be described in detail. It may be thought of as a payment transaction, in which party P transfers to S an amount of value.

Box 201 begins with P forming message [21] from the value p, the computation of which was already described in box 101.

Box 202 shows that, after receiving message [21], S chooses an index set w at random from the subsets of the set of integers between 1 and t. Then S sends w to P as message [22].

Box 203 is first an indication that i ranges over the index set received as message [22]. Then, for each value of i, message $[23.1]_i$ is sent with content $a'_i$, as saved from box 101. Next index variable j is allowed to range over the complementary set, i.e. those values between 1 and t that are not in [22]. For each value of j, message $[23.2]_j$ is sent to S containing the exclusive-or of u and $a'_j$ already mentioned.

Two temporary variables are defined at this point for notational clarity. One is d', which is taken to be the product over all i of the d(i). The other is c', which is similarly defined as the product over the c(j).

The final message of this box, [23.3], is then sent. It consists of p' raised to a power and divided by a value. The power is the product of d' and c'. The divisor contains two multiplicative factors. The first factor is the product over all j of the image under f of each $a'_j$, where each image is raised to a corresponding d'c' over c(j). The second is the product over all i of the image under f of each exclusive-or sum of an $a'_i$ and u, each raised to the d'c' over d(i) power.

Box 204 represents the final testing by S. First the index variable i is allowed to range over the set w; j is similarly allowed to range over the complement of w also as already described in box 203.

The final equality is then tested. On the left side is message [23.3] received raised to a power. The power has as numerator the product dc and denominator product of d' and c'. The right side is the product of three factors: The first is message [21] raised to a power determined as function g already defined applied to message [21]. The second is the product of the image under f of each message $[23.1]_i$ raised to a power. This power is dc divided by c(i). The third and final is similarly the product of the image under f of all the messages $[23.2]_j$ received, each raised to the corresponding dc over d(j) power.

Turning now to FIG. 3, the third flowchart for part of the preferred embodiment will now be described in detail. It may also be thought of as a withdrawal transaction, in which party P withdraws a certain amount of value from party B. For clarity in exposition, only additions and modifications to FIG. 1 are shown; they yield a new flowchart, which has further features, benefits, and advantages that will be more fully appreciated with reference to FIGS. 4–5.

Text appearing in quotes in FIGS. 3–5 indicates the source box where operations are drawn from to complete the box containing such text. Four types of reference are made: (1) an indication of the source box, by "same as box xxx:"; which new operations are to be added, by "including:"; which operations from the source box are to be replaced by new operations instead of being copied, by "re-defining:"; and which tests of the source box are to be replaced, by "testing instead:".

Box 301, accordingly, indicates first three operations that are to be included from source box 101 to obtain the new flowchart. The first of these is the additional random selection of $r''_i$ from the residues modulo m, and the selection of $b_i$ from some suitable domain, such as, for example, the bit strings of length 50 to 300 bits. It is believed that the choice of this parameter should be made to avoid collisions with acceptable "birthday paradox" probability, depending on the expected number of $b_i$ that will be used for the lifetime of m, c, d, and e. It should also be pointed out that the choice of z is believed preferably coprime with dce here, rather than only with dc as in FIG. 1.

The second new operation is the sending of s messages $[11.3]_i$ to B. The i'th such message contains the product of $r''_i$ raised to the e power times the already described function f', applied to $b_i$. The third new operation is the setting of temporary variable q" to the image under function h of q (from box 101) concatenated with message each $[11.4]_i$. The intention here is to ensure that q" depends via cryptographic function h on all the messages sent in the new box 301 except message [11.3].

Two operations are indicated as being re-defined. The first is the setting of p. The operation of box 101 is not performed; instead, p is set to the product of two factors. The first factor is q" raised to the z power; the second is r raised to the dce power. The other operation is the sending of message [11.3] to B. The value sent is the product of z and the image of p under g, with the whole quantity reduced modulo dce.

Box 302 then defines its difference with box 102 as the replacement of the test in the later by a test that message [11.3] is coprime with dce.

Box 303 shows the addition to box 103 of the sending of two sets of messages, each indexed by j. The first, $[13.4]_j$, contains r"j, and the second, $[13.5]_j$, contains $b_j$.

Box 304 is first the inclusion of three operations into box 104. The first operation tests the construction of each message $[11.4]_j$ by comparing its equality with the product of message $[13.4]_j$ received raised to the e, the quantity times the image under f', of message $[13.5]_j$ received. The second operation defines q''' as the image under h of q' and all the $[11.4]_i$, for i in {1, . . . ,s}. The third operation saves a value for later use in FIG. 5. The value is denoted $b''_{@k}$ and receives value $[11.4]_k$, where this notation as already described indicates a re-indexing.

The final operation shown in box 304 is the re-defining of message [14] to be the product of two factors. The first factor is q''' raised to a power shown as the quotient of message [11.3] over the product dce. The second factor is the product over k of three terms. The first two are as in FIG. 1—i.e. message $[11.1]_k$ to the 1 over c(@k) and message $[11.2]_k$ to the 1 over d(@k)—and the third is message $[11.4]_k$ raised to the inverse of e(@k).

Box 305 illustrates first an alternative test to that shown in FIG. 1. The value of message [14] is raised to the dce power and compared for equality with the product of two factors. The first factors is q" raised to the [11.3] power. The second factors is again the product over k of three factors. The first of these is $[11.1]_k$ raised to the dce over c(@k) power, the second is $[11.2]_k$ raised to the dce over d(@k) power, and the third is $[11.4]_k$ raised to the dce over e(@k) power.

Next p' is re-defined. The first of two factors multiplied into message [14] is q" raised to a power that is the div of z times g(p) on the left and dce on the right. The second such factor is r raised to the g(p) power. The product over k of three factors is divided out: $r_k$ raised to the c over c(@k), $r'_k$ to the d over d(@k), and $r''_k$ to the e over e(@k).

Finally, two re-indexings are included for use in FIGS. 4–5. The first sets b' indexed by @k to b indexed by k, the second assigns r''' subscripted by @k the value of r" subscripted by k.

Turning now to FIG. 4, the fourth flowchart for part of the preferred embodiment will now be described in detail. Like FIG. 2, it may be thought of as a payment transaction wherein P transfers value to B. Cooperating with FIG. 3, however, the amount of value transferred is not fixed at the time of withdrawal, but rather can be chosen at the time of payment to be any one of plural possible amounts.

The actual amount may be represented by a subset w' of the integers between 1 and t, where this subset is assumed known to both parties. One example rule for encoding values by this set is: if a number appears in the set, then the corresponding bit in the binary representation of the amount is 1; otherwise it is 0. If w' were, say, to be {1,3,5}, then the amount would be 10101 in binary, which is 21 units of value. Other denomination schemes are of course readily conceived.

Box 401 indicates that its content is the same as that of box 201.

Box 402 similarly shows that its content is identical with that of box 202.

Box 403 first depicts the inclusion in box 203 of letting k range over the values in w' and letting k' range over the values in the complement of w' with respect to its universal set of {1,...,t}. Also depicted in this first part is the sending of $b'_k$ as message $[23.4]_k$ to B. Further, e' is defined as the product over k' of the e(k'). The value of message [23.3] is shown as redefined to be the raising of p' to the product d', c', and e'; and then dividing this quantity by three further products: f applied to the $a'_j$ the quantity to the d'c'e' over c(j) power; f applied to the $a'_i$ exclusive-or'ed with u, the quantity to the d'c'e' over d(i) power; and f', applied to $b'_{k'}$, the quantity to the d'c'e' over r(k') power.

Box 404 at last illustrates first including in box 204 also the setting of k to range over w' and k' to range over the complement of w'. The final difference with box 204 is in the testing of message [23.3] received. The left-hand-side of the equality test shows [23.3] raised to a quotient. The numerator is dce, and the denominator is the product of three products: the d(i), the c(j), and the e(k'). The right-hand-side has four factors. The first is message [21] received raised to the image under g of message [21]. The second is the product of all the $[23.1]_i$ received, each raised to the dce over c(i) power. The third is similarly the image under f of each message $[23.2]_j$ raised to the quotient of dce and the corresponding d(j). The fourth and final factor is the product of the images under f', of messages $[23.4]_k$ received, each raised to dce over e(k).

Turning now to FIG. 5, the fifth flowchart for part of the preferred embodiment will now be described in detail. It may be thought of as a refund transaction in which P is returned some value that could have been but should not have been transferred in an instance of FIG. 4. As will be appreciated, each instance of FIG. 4 may give rise to several instances of FIG. 5, although these could be combined as will be mentioned later.

Box 501 first shows how P forms message [51.1] as $b'_{ij}$. The first subscript i ranges from 1 to t and corresponds to the subscripts of FIGS. 3-4. The second subscript, which is indicated without separating comma as already mentioned, indicates an instance of FIG. 3. Without loss of generality, it will be assumed here that there are n instances of FIG. 3 that might correspond to this $b'_i$. As will be appreciated when FIG. 7 is considered in detail, the same notation is used there when the effect of n instances of FIG. 3 are achieved with advantages in a single transaction.

A second message is also sent to B, [51.2], indicating the value of i used as the first subscript of the value sent as message [51.1].

Box 502 expresses how B first chooses a value x at random from the domain of the bit-strings of length equal those produced as images of function h' already mentioned. Next B lets n range over the interval 1 to n inclusive. Finally, for each j, B sends a message $[52]_j$ that is formed as the exclusive-or of x and an image under h'. The argument for h' is a quotient raised to the lover e([51.2]) power. The quotient's numerator is b'' (subscripted by received message [51.2]) saved from the j'th instance of box 304. Its denominator is the image under f', of message [51.1] received.

Box 503 indicates how P first forms y at random form the possible second arguments of function g' already mentioned. Next x' is computed as the exclusive-or sum of message [52] received and the image under h' of r''' subscripted by i (retained from the j'th instance of box 305). Then g' is applied with x' as first argument and y as second argument, and the result is sent to B as message [53].

Box 504 illustrates how B sends x to P after message [53] is received.

Box 505 shows how P first tests received message [54] for equality with x'. When this test succeeds, P sends y to B as message [55].

box 506 specifies how B tests message [53] for equality with the image under g' of x as first argument and message [55] received as second argument.

It is believed that the above allows P to hide the value of j from B even unconditionally, while allowing P only a chance of 1 in the number of images of h' of cheating. As will readily be appreciated by those of ordinary skill in the art, plural instances of FIG. 5 could be conducted in parallel, with the corresponding messages of all instances sent as single physical transmissions. And it would also be apparent in such an anticipated use how multiple x' could be combined, such as by concatenation, for economy within a single image under g', and how a single y would still suffice.

Turning now to FIG. 6, the sixth flowchart for part of the preferred embodiment will now be described in detail. It expresses modifications to some boxes of FIGS. 1, thereby offering further features and advantages. In particular, it illustrates how P can be protected against B falsely claiming that P has acted improperly by, for example, transferring value to one or more S's based on the same instance of message [14] already mentioned. This protection would be exercised, as would be obvious to those of skill in the art, by P showing some or all of the $a_i$, $r_i$, and $r'_i$ not revealed to B in FIG. 1.

A function g'' is introduced for this purpose, and it is believed to preferably have certain properties to increase security for P, and in fact it could even be chosen in whole or in part by P. There should, at least with high probability on average, be multiple pre-images under g for each image used. The number of such pre-images should preferably be such that its reciprocal is an acceptably small chance that B cheats. For example, $2^{32}$ might be suitable for some applications. It is believed preferable that each image under g'' has substantially the same number of pre-images.

One example construction would be simply to truncate, say by 32 bits (although of course any other number could be used in the following examples), the image of a bijective one-way function, such functions as are well known in the art. A second example, which has certain advantages to be described, is a function that maps 32 residues modulo m into their squares modulo m and yields the concatenation of the 32 squares as its result. It is believed that obtaining multiple distinct pre-images of such a g'' would allow m to be factored and the chance of B guessing the correct pre-image would remain only $2^{-32}$.

Box 601 indicates how box 101 is modified by including the two operations shown. The first is random choice of message $x''_{j'}$ from the domain of function g already described above. It should be clear to those of skill in the art that this index j' is a serial number of the instance of this transaction. The second operation is the sending of message [11.5]$_{j'}$ to B. The message content is the image under g'' of $x''_{j'}$.

Box 602 shows an extension to box 102. It consists of sending message [12.1]$_{j'}$ to P. The message contains the 1/d'' power of an image under h. Its arguments are message [11.5]$_{j'}$ received, q' (computed here in addition to or instead of in box 104 or 304), message [11.3] from box 101 or 301, and v. (It will be appreciated by those of skill in the art how some of the arguments of h apart from the first could be omitted without departing from the inventive concepts here disclosed. Also, the same function h used in FIGS. 1, 3, and 7 is preferably used here, though another suitable collision free function could as well be used.)

Box 603 denotes the inclusion of two operations in box 103. The first is an equality test with message [12.1]$_{j'}$ received and raised to the d'' power on the left. The right side is an image under h of four arguments: message [11.5]$_{j'}$, variable q from box 101, message [11.3] sent in box 101, and message [12] sent in box 102.

Box 604 portrays the including in box 104 of an equality test. One side is g'' applied to message [13.6] received in the previous (j'−1'th) instance of the present flowchart; the other side is message [11.5] also from that same most recent previous instance.

Box 605 is shown as being the same as box 105.

Turning now to FIG. 7, the seventh part of a flowchart for a preferred embodiment will now be described in detail. It may be thought of as a withdrawal transaction, in which party P withdraws a certain amount of value from party B at once in the form of n separate signatures.

Box 701 shows how party P first lets i range from 1 to t, k from 1 to s, and j from 1 to n. Then, for each value of i and k, $r_{ik}$, $a_{ik}$ and $r'_{ik}$ are chosen independently and uniformly at random from the residues modulo m. It will be appreciated that each of these three may be thought of as a t by k matrix. A vector of n such residues is also chosen and called $r_j$. A final random choice is the vector z(j) of n random values between 1 and dc that are believed preferably coprime with dc.

The first messages shown as sent to B are [71.1]$_{ik}$, the combination of which may be thought of as a t by s matrix of residues, each formed as the product of the corresponding $r_{ik}$ raised to the c(i), the quantity times f applied to $a_{ik}$. Similarly each message [71.2]$_{ik}$ denoted as sent to B, which may be thought of as collectively forming a t by s matrix of residues, is the product of the corresponding $r'_{ik}$ raised to the d(i), the quantity times the image under f of the exclusive-or of $a_{ik}$ with u.

For each value of j, an image under h is formed that depends on j as one argument and the product of all the [71.1]$_{ik}$ as well as the [71.2]$_{ik}$ as the other argument. It would be obvious to those of skill in the art, however, that the concatenation of all these values, or many essentially equivalent but preferably non-algebraic other way of combining them, might be preferred, with the product being shown here for notational clarity only. Also for each j, p(j) is formed as the product of two factors. The first is $q_j$ raised to the z(j) power, the second is $r_j$ raised to the dc power.

The final vector of n messages formed in this box and sent to B is shown as [71.3](j). For each j, what is sent is the reduction modulo dc of z(j) times g applied to p(j).

Box 702 indicates that, after receiving message [71.1]$_{ik}$, [71.2]$_{ik}$, and [71.3](j) for all i between 1 and t, k between 1 and s, and j between 1 and n, B creates a set of n random index sets $v_i$ of integers. Each such set contains exactly n elements and these elements are chosen uniformly as distinct integers between 1 and s. Then B sends these sets to P as message [72](i). An additional check, believed preferably made by B, is that each message [71.3](j) is coprime with dc.

Box 703 describes first how P tests each such set received as message [22](i) to ensure that its cardinality is t. Then the variable k'(i) is allowed to range over the elements not in the set [72](i), in other words, j ranges over the complement of [72] with respect to the universal set containing the integers from 1 to s. As will be appreciated, the notation k'(i) has been used here and throughout the following for clarity simply as a reminder that k' does in fact depend on i. For each value of i and each value of k'(i), P sends B message [73.1]$_{ik'(i)}$ containing $r_{ik'(i)}$, message [73.2]$_{ik'(i)}$ containing $a_{ik'(i)}$, and message [73.3]$_{ik'(i)}$ containing $r'_{ik'(i)}$.

Box 704 first illustrates the setting of index variable k'(i) by B to also range over the complement of set $v_i$ as already described for box 703. For each value of i and k'(i) the formation of messages [71.1]$_{ik'(i)}$ and [11.2]$_{ik'(i)}$ already received is tested by re-computing from message [73.1]$_{ik'(i)}$, [73.2]$_v$, and [73.2]$_{ik'(i)received}$. The first, [73.1]$_v$, is tested for equality with the product of [73.1]$_{ik'(i)}$ raised to the c(i), the quantity times the image under f of [73.2]$_v$. The second, [71.2]$_{ik'(i)}$, is tested for equality with the product of [13.3]$_{ik'(i)}$ raised to the d(i), the quantity times the image under f of the quantity [73.2]$_{ik'(i)}$ exclusive-or'ed with u.

The value of $q'_j$ is computed, just as it was in box 701 under the variable name $q_j$, by applying the hashing function h to j and all the messages [71.1]$_{ik}$ and [71.2]$_{ik}$ in the same order as used in box 701.

At last messages [74]$_j$ are sent to P. The j'th such message is computed as the product of two factors. The first is $q'_j$ raised to a power that is the quotient of message [71.3](j) over dc. The second factor is the product of two products over all i in 1 to t. The first product is of the the messages [71.1]$_{iv(ij)}$, each raised to the c(i). Thus a particular value of i acts as the first subscript of the message and the second subscript is taken as the j'th component of the set v(i). Similarly, the second product is of the messages [72.1]$_{iv(ij)}$, each raised to the d(i).

Box 705 depicts first the testing by P of each message [74]$_j$ received from B. Consider the j'th such message. The left side is the message raised to the dc power. The right is the product of two factors, the first of which is $q_j$ raised to the [71.3](j). The second factor is the product over all i of two factors. The first of these is message [71.1] with first subscript i and second subscript the j'th element in the set [72]$_i$, the entire quantity raised to the dc over c(i) power. The second, being similar to the first, is message [71.2] with first subscript i and second subscript message [72] subscripted by i and then by j, the whole quantity raised to the dc over d(i) power.

Next, again for each value of j, p'(j) is computed as message [74] received with two factors multiplied in and a product over i divided out. The first of these factors put in is $q_j$ raised to a div with the product of $z(j)$ and g applied to $p(j)$ on the left and the product dc on the right. The second of the factors multiplied in is $r_j$ raised to the g of $p(j)$. The product divided out has two factors. The first is r with first subscript i and second subscript determined as the j'th element in the set [72](i). Similarly, the second is r' with first index i and second index being the j'th element in [72](i).

Finally, as in FIG. 1, the re-indexed value of a is saved as a. The value a' with first subscript i and second subscript j is obtained from that with first subscript i and second subscript message [72](i) subscripted by j.

For the purposes of FIGS. 8 and 9, some additional notation will now be defined. The public exponents of party B used in in these two figures are taken for simplicity to be the prime divisors of $p:p_1, p_2, \ldots, p_{2y}$. This is believed to mean that p should be coprime with the order of the group or subgroup used.

When one of the functions f and h already mentioned is written with multiple arguments, it may be thought of as being applied to their concatenation. The two functions are also preferably here taken as "claw-free," in the sense that it is difficult to find a pre-image for each so that the two corresponding images are identical.

Sets may be combined with the usual set operations: " " for union and " " for intersection. Furthermore, addition of a scalar to a set simply results in a set with the scalar added to each original set element. The function "max" applied to a scalar and a set simply returns the set, unless the set is empty, in which case it returns the scalar.

A novel function d of two arguments (distinct from the integer d(i) used in FIGS. 1–7) yields sets. Although many suitable functions could readily be conceived by those of skill in the art, one specific function will be described here for clarity. It takes two arguments, the first of which is an integer which is interpreted as its binary representation consisting y bits. The second argument is an integer which specifies a permutation on y elements. If only the cyclic permutations are used, then the second argument would merely specify the number of positions that the bit vector representation of the first argument should be circularly shifted; if all bit-wise permutations are allowed, then any of the well known ways to encode permutations as integers could be used, such as those described in the widely known series by D. E. Knuth: "The art of computer programming"; and if any invertable linear mapping is allowed, then they can be constructed by well known techniques. After the permutation, the bit vector is converted to the output set as follows: if the first element in the bit vector is 1, then 1 is included in the set; if the second bit in the vector is 1, then 2 is included in the set; and so on until if the last bit of the vector is 1, then y is included in the set. In other words, the result of the function d is the index set of 1 bits in the binary representation of the first argument as permuted by the second argument. A related function d' is defined for notational clarity as the complementary index set; i.e. d'(,) is $\{1, \ldots, y\} - d(,)$.

A function c maps its argument, which is an index set thereby distinguishing it from the integer c(i) of FIGS. 1–7, into an integer. The set selects the corresponding $p_i$, described above, and their product is returned as the function's result. Thus, for example, $c(\{1,3\})$ is $p_1 p_3$.

Turning now to FIG. 8, the eighth part of a flowchart for the preferred embodiment will now be described in detail. It may be thought of as a withdrawal transaction, in which party P withdraws a certain amount of value, from party B.

Box 801 shows party P first choosing $r_i, x_i, a_i, b_i$ independently and uniformly at random, such random selection as already mentioned above. For each value of i, which ranges from 1 to y, a separate random choice is made for each of the four. The $r_i$ are chosen from the elements of the multiplicative group used. The $x_i$ are chosen from some suitable range of integers used as arguments for f and h. Similarly, $b_i$ is also chosen from a range of integers. Of course, as is well known in the art, the size of the domain of f and h must be large enough to prevent violation of the collision property already mentioned by so called "meet-in-the-middle" attack. This is believed to mean that binary representations of the $x_i$ and the $r_i$ combined should be larger than 64 bits, with 128 bits being typical of practice today.

Next P forms, for each value of i, a set z(i). Consider a particular value of i. First the function d is applied to its arguments $a_i$ and $b_i$, yielding a set of indices according to the definition of d above. This value is saved at temp1. Then the bit-wise exclusive-or operation is applied to $a_i$ and u are exclusive-or'ed to yield the first argument for the d function, the second being taken again as $b_i$, with the resulting set saved as temp2. Then temp2 is added to the scalar y, which as mentioned above increases each integer in the set by y, to yield temp3. Next temp1 and temp3 are combined by the set union operation defined above, to yield set temp4. The value of z(i) is then computed as the complement of temp4 with respect to the set of integers between 1 and y, i.e. the set difference of $\{1, \ldots, y\}$ and temp4.

The last operation in this box is the sending of s messages from P to B. Consider the ith such message. Its value is the product of three terms. The first of these terms is $r_i$ raised to the p power. The second of the terms is the image under f of $a_i$ and $b_i$ raised to a power. This power is the result of applying c to the set z(i). The third term is the image under h of $x_i$.

Box 802 indicates that, after receiving message [81]$_i$, for all i between 1 and s, B creates a random index set v of integers such that it contains s−t elements and the elements are chosedn uniformly as integers between 1 and s. Then B sends this set v to P as message [82].

Box 803 describes first how this set received as message [82] by P is first tested by P to ensure that its cardinality is exactly s−t. Then the variable j is allowed to range over the elements of the set [82]. For each value of j, P sends B $r_j$ as [83.1]$_j$, $x_j$ as [83.2]$_j$, $a_j$ as [83.3]$_j$, and $b_j$ as [83.4]$_j$.

Box 804 first illustrates the setting of a temporary variable by B for each value taken on by index variable j which ranges over all values in the set v already mentioned in box 802. First B computes d with message received [83.3]$_j$ as its first argument and message received [83.4]$_j$ as its second to produce the set temp1. Then B applies d to first argument [83.3]$_j$ exclusive-or'ed with u and second argument [83.4]$_j$, with the resulting set being added to scalar y before being saved as temp2. Then the set union of temp1 and temp2 is taken and the result set-subtracted from the set of integers from 1 to 2y, yielding z'(j).

Next a test is repeated for each value taken by j. Consider a particular j. Message [81]$_j$ received in box 802 is tested for equality with the product of three terms. The first term is received message [83.1]$_j$ raised to the p power. The second is f applied to received message [83.3]$_j$ as first argument and message [83.4]$_j$ as second argument, with the result of the function raised to the power obtained by applying function c to z'(j). The third term is h applied to message [83.2]$_j$. Provided all these tests are satisfied, as already mentioned, index variable k is allowed to range over the complement of set v over the set of integers between 1 and s. A product is formed of all message [81]$_k$. This product is then raised to the 1/p power, i.e. its pth root is extracted, and the result is sent to P as message [84].

Box 805 depicts first the same same setting of index variable k to range over the complement of the set contained in message [82] received in box 803 above. Then equality is tested between received message [84] raised to the p and the product of all messages [81]$_k$. After this test succeeds, temporary variable n is set to message [84] divided by the product of all the r$_k$; thus, it contains all the unopened candidates in unblinded form.

Finally, three variables are re-indexed for notational clarity and also possibly to save storage. Take x first for example. The new variable $x'_1$ is set to the value of $x_k$ for the smallest element k; $x'_2$ is set to the value of $x_k$ for the second smallest index k; and so on until $x'_t$ is set to $x_k$ for the largest value taken on by k. Similarly, the new variable $a'_1$ is set to the value of $a_k$ for the smallest element of k; $a'_2$ is set to the value of $a_k$ for the second smallest index k; and so on until $a'_t$ is set $a_k$ for the largest value taken on by k. The new variable $b'_1$ is set to the value of $b_k$ for the smallest element of k; $b'_2$ is set to the value of $b_k$ for the second smallest index k; and so on until $b'_t$ is set to $b_k$ for the largest value taken on by k.

Turning now to FIG. 9, the ninth flowchart for part of the preferred embodiment will now be described in detail. It may be thought of as a payment transaction in which party P gives to S an amount of value.

Box 901 begins with P forming messages [91.1]$_i$ and [91.2]$_i$ and sending them to S. First the index variable i is allowed to range over the integers from 1 to t. Then for each value of i, message [91.1]$_i$ is formed as $x'_i$ and message [91.2]$_i$ as $b'_i$.

Box 902 shows that S first chooses an index set w at random from the subsets of the set of integers between 1 and y. Then S sends this to P as message [92].

Box 903 is first the saving by B of the corresponding index set also under the name w (for clarity) and the complement set, with respect to the set of integers between 1 and y, under the name w'. The value n from box 105 is then raised to a power to yield the new temporary variable n'. The power is formed by applying the function c to a set. This set is the union of set w' and the scalar sum with y of set w.

Next index variable i is allowed to range over the integers from 1 to t. For each value of i, a temporary variable z(i) is given a value that is the union of two sets. The first of these sets is the result of applying d to $a'_i$ and $b'_i$ and taking the intersection of the result with w. The second set in the union is the scalar sum of y with a third set. This third set is the result of applying d to $a'_i$ exclusive-or'ed with u as first argument and $b'_i$ as second argument, and then intersecting the result with w'. For each value taken on by i, a message [93.1]$_i$ containing z(i) is sent to S.

Next a temporary variable z'(i) is established for each value of i. Again considering a particular i, the value of z'(i) is the union of two sets. The first this time is d' applied to $a'_i$ and $b'_i$ with the result intersected by w'. The second set is again the sum of scalar y with the intersection of w and the result of applying d' to $a'_i$ exclusive-or'ed with u as first argument and $b'_i$ as second argument.

The final message [93.2] is then sent. It consists of n' divided by a product ranging over all values of i. The term corresponding to each value of i is f applied with $x'_i$ and $b'_j$ as first and second arguments, respectively, the quantity raised to a power. This power is the result of applying c to the set z'(i).

Boxes 904 represents the final testing by S. First the index variable i is allowed to range over the set of integers between 1 and t. Then temporary variable w' is assigned the complement of w, just as in box 903. Next a temporary variable n", that will be one side of the equality tested, is computed as message [93.2] raised to a power that is the result of applying c to a set. This set is the union of w and the set formed from the scalar sum of y with set w'. Next a temporary variable z"(i) is given a set as value for each index taken by i: the set complement (relative to the set of integers between 1 and 2 y) of message [93.1]$_i$ received.

Finally the equality is tested, with n" on one side, as already mentioned, and the product over all values of i of two terms. The first term is f of message [91.1]$_i$ and [91.2]$_i$ raised to a power. This power is either c applied to z"(i) or, if this yields the empty set, 1. The second term is h applied to message [91.1]$_i$.

Turning now to FIG. 10, the tenth flowchart for part of the preferred embodiment will now be described in detail. It may be thought of as a public key digital signature issuing and checking technique.

Box 1000, of FIG. 10a, gives the definition of function p". The single argument of p" is mapped injectively into a prime. An example of how to achieve such a function is indicated for concreteness, though many variations are of course readily devised. Other examples are 2 raised to the power x, which is believed to have been proven to suffice. As is well known in the art, the actual choice would depend on the size of the argument and whether the Riemann hypothesis is assumed. It would also be obvious to those of skill in the art that a table could be made to implement this function if the size of its argument was sufficiently constrained.

First the argument x is cubed and the result is taken to yield temp1. Then temp1 is rounded up to the nearest integer, as indicated by being enclosed in the well know "☐" symbols, to yield temp2. This value of temp2 is tested for primality. If the test succeeds, temp2 is returned as the result of p". If the test fails, then 1 is added to temp2 and temp2 is again tested for primality; this procedure is repeated until temp2 attains a value which is prime. As is of course well known, certain initial skips and step sizes other than 1 can be used to avoid testing multiples of very small primes.

Another approach to performing the function of providing an injective mapping from integers (possibly over a restricted interval) to primes involves generating each prime at random from the primes in an interval determined by the corresponding argument. Generating primes in an interval is well known in the art, as described in articles such as "Every prime has a succinct certificate," by V. R. Pratt, in SIAM Journal of Computing, 1975, pp. 214-220; "Fast verification, testing, and generation of large primes," by D. A. Plaisted, in Theoretical Computer Science, 1979, pp. 1-16; or more recently by U. Maurer at ETH Zurich, to appear. With this approach the prime generated and/or a certificate of its primality may need to be passed along with the result of p". If only the prime were to be passed, then it could of course be tested for primality. It is preferred to pass the certificate, since this allows primality to be verified more quickly. For clarity such extra data is not illustrated in FIGS. 10 and 11, but as would be obvious to those of skill in the art, such data would be passed along from the first call of p'' with a particular argument to any party(s) who would have to make a subsequent call with that same argument.

Box 1001, of FIG. 10b, shows how party B forms a signature on message m'' using the function p'' just defined and the constant c'', which is assumed to be an agreed and public value like the modulus m already mentioned. The signature itself is formed as c'' raised to 1 over the image of m'' under p''. This signature is sent as message [101.1] to P. Also sent is the message signed, m'', as message [101.2].

Box 1002 illustrates P checking the signature. On the left side of an equality test is received message [101.1] raised to a power that is the image of received message [101.2] under p''. The right side of the test is simply c''.

Turning now to FIG. 11, the eleventh flowchart for part of the preferred embodiment will be described in detail. It may also be thought of as a public key digital signature technique.

Box 1100, of FIG. 11a, gives a definition of function p''' having two arguments. Index variable i is indicated as running from 1 to k, where k is the constant that denotes the number of bits in x, which is based on the assumption made here for clarity (and returned to later) that every x is represented as a bit string of the same length. The first argument of p''', shown as x, is the message to be signed; the second, shown as y, will be a sequence number as described below. The result of applying p''' is computed as the product of two products, each of which is over all values of index variable i. Both of these products are on images under p''. In the first, p'' takes its argument as $2ky+i$ when the i'th bit position of x treated as a binary integer of k bits is 1; its argument being 0 otherwise. The argument of p'' in the second product is $2ky+k+i$ when the i'th bit position of x is 1; the argument is 0 otherwise. (The convention is taken here for clarity that $p''(0)=1$.) One way to view this function already mentioned, is as expanding the first argument to be the concatenation of its bit representation with the complement of that representation, selecting a distinct vector of primes by the second argument, and forming the result as the product of exactly those primes in the vector that correspond to 1 bits in the expanded first input.

Box 1101, of FIG. 11b, depicts the issuing of a signature by B. First the state saving variable s'' is incremented by 1 to reflect the fact that another signature is being issued. Then message [111.1] is sent to P. Its content is the constant c'' raised to the reciprocal of an image under p'''. The first argument of p''' is the message to be signed, already mentioned as being shown as m''; the second argument is the state variable s''. Messages [111.2] and [111.3] are also sent to P, and they contain m'' and s'', respectively.

Box 1102 indicates how P tests the signature and accompanying values received by testing a single equality. On the left is message [111.1] received raised to a power that is determined as an image under p'''. The first argument of p''' is message [111.2] received, and the second argument is message [111.3] received. The right-hand-side is the constant c''.

It would be obvious to those of skill in the art how the assumption that all messages have the same length, made for clarity above, can readily be relaxed. A simple example would be to reserve at least one value as a delimiter. Then a message would be defined to begin with a delimiter and to end with the next delimiter. Many other variations are well known in the coding art.

As would be obvious to those of ordinary skill in the art, there are many essentially equivalent orders to evaluate expressions; ways to evaluate expressions; ways to order expressions, tests, and transmissions within flowchart boxes; ways to group operations into flowchart boxes; and ways to order flowchart boxes. The particular choices that have been made here are merely for clarity in exposition and are sometimes arbitrary. Notice, for example, that wether a signature is first tested in blinded form and then unblinded, as shown for clarity here, or unblinded and then tested, is quite unessential. Also, for example, the order in which messages are generated within a box and sent may be of no significance.

Certain variations and substitutions may be apparent to those of ordinary skill in the art. For example, any abelian group with public group operation and order known only to B can be used instead of RSA. As another example, instead of returning a prime in FIG. 10a, a composite could be returned having a unique prime factor. A still further example would be the use of multiple constants within each signature or different constants for indicating different signatures.

Apparatus for effecting public-key digital signatures in accordance with this invention is depicted symbolically in FIG. 12. Here, the data processor means 1202 of a first party in conjunction with associated means 1204 is capable of determining an exponent from a first message using a procedure known to the first party and to a second party, the exponent containing at least one prime factor uniquely determined by the message. In addition, processor 1202 in conjunction with associated means 1206 is capable of forming a root on a constant known to both first and second parties, said root corresponding to the exponent. This root is communicated to the second party's processor 1208 via a suitable communication link (indicated by dotted lines in FIG. 12). Then processor 1208 in conjunction with associated means 1210 checks the received root by computing the exponent, raising the root to said exponent to produce a result and then verifying that the result is said constant.

In FIG. 13, the data processor means 1302 of a first party in conjunction with associated means 1304 determines, from a first message and a state variable, a set of exponents using a procedure known to both the first party and a second party, the set of exponents containing at least one prime factor uniquely determined by the state variable and the set of exponents being different from energy subset of a set corresponding to a different message. Then, processor 1302 in association with means 1306 forms roots on a constant, the constant being known to the first and second parties and corresponding to at least the members of the set of exponents. Such roots are then communicated (together with the state variable) to the second party's processor 1308 (e.g., via a suitable communication link indicated by dotted lines). Then processor 1308 and means 1310 check the roots by computing said set of exponents, raising the roots to the powers that are members of the set of exponents to produce a result and verifying that the result is said constant.

In FIG. 14, the apparatus for showing and verifying public-key blind signatures includes a second party's processor 1502 which, in conjunction with means 1504, issues a challenge (via the dotted line link) to a first party's processor 1506 that is unpredictable to the first party. In response, processor 1506 and associated means 1508 forms a response to the challenge that includes only roots and corresponding bases whose public exponents are indicated by the challenge (and excludes roots and corresponding bases whose public exponents are not indicated by the challenge). The response received by processor 1502 is then processed in conjunction with means 1510 to check it by raising the response to the indicated powers to produce a result and verifying the result.

While these descriptions of the present invention have been given as examples, it will be appreciated by those of ordinary skill in the art that various modifications, alternate configurations and equivalents may be employed without departing from the spirit and scope of the present invention.

What is claimed is:

1. A method for verifying public-key digital signatures, the method comprising the steps of:
    determining an exponent from a first message by a first party using a procedure known to the first party and a second party, the exponent containing at least one prime factor uniquely determined by said message;
    forming by said first party of a root based on a constant known to said first party and said second party, said root forming a part of said exponent;
    communicating said root to said second party by said first party; and
    checking the validity of said root by said second party computing said exponent, raising said root to said exponent to provide a result, and verifying that the result is said constant.

2. A method for verifying public-key digital signatures, the method comprising the steps of:
    determining, from a first message and a state variable, a set of exponents by a first party using a procedure known to the first party and a second party, the set of exponents being distinct from every subset of a set corresponding to different message;
    forming by said first party of roots on at least one constant, the constant known to said first party and said second party, and the roots corresponding to at least the members of said set of exponents;
    communicating said roots and said state variable to said second party by said first party; and
    checking the validity of said roots by said second party computing said set of exponents, raising said roots to the powers that are members of said set of exponents to produce a result, and verifying that the result is said constant.

3. A method of verifying public-key digital blind signatures, the method comprising the steps of:
    forming a plurality of candidates by a first party, each such candidate formed as at least one base value raised to a proper subset of powers chosen from a set of different powers;
    forming by a second party, on a at least one subset of said candidates received from said first party, roots including, on at least one candidate, at least one inverse of one of said set of distinct powers;
    unblinding said roots received by said first party cancelling a subset of said at least one base values from said subset of said candidates, those base values cancelled being those that received only roots cancelling said powers that were included in the step of forming by a second party.

4. A method for transactions between a first and a second party, where the first party should be able to provide information on all transactions and such information and its completeness is protected from being convincingly disputed by the second party, the method comprising the steps of:
    initially establishing by said second party of a public key;
    initially establishing by said first party of a first transformed message under an agreed one-way function, where the corresponding message prior to transformation is known to said first party;
    transacting a k'th transaction between said first and said second party, including
        (a) said first party issuing to said second party a k+1'th transformed message under said established one-way function of a k+1'th message not known to said second party;
        (b) said second party issuing to said first party a digital signature including as message content at least said at least k+1'th transformed message;
        (c) said first party receiving from said second party a digital signature on said k+1'th transformed message;
        (d) said first party checking the validity of said signature using said initially established public key; and
        (e) said first party issuing said k'th message to said second party, only if said check is successful.

5. The method of claim 4, wherein the one-way function includes plural messages for substantially every transformed message.

6. The method of claim 4, wherein other transaction details are included in and checked for in said digital signature.

7. A method for showing and verifying public-key blind signatures by a first party to a second party, the method comprising:
    issuing a challenge by said second party to said first party that is unpredictable to said first party;
    forming by said first party a response to said challenge that includes only those roots and corresponding bases whose public exponents are indicated by said challenge and excludes those roots and corresponding bases whose public exponents are not indicated by said challenge; and
    said second party checking said response by raising said response to said public exponents indicated by said challenge to produce a result and verifying the result.

8. The method of claim 7, further comprising including in said challenge an amount part that is mutually agreed between said first and second parties and which causes particular values to be revealed by the first party to the second party; and said values corresponding, as determined by the corresponding roots, to certain amounts of value in a value transfer system.

9. A method for showing and verifying public-key blind signatures by a first party to a second party, the method comprising:
    issuing a challenge by said second party to said first party that is unpredictable to said first party;
    forming by said first party a response to said challenge that includes only those roots whose public exponents are indicated by said challenge and excludes those roots whose public exponents are not indicated by said challenge; and said second party checking said response by raising said response to said public exponents indicated by said challenge to produce a result and verifying the result.

10. A method for conducting a cut-and choose protocol using public-key blinded signatures, the method comprising the steps of:

forming, by a first party, plural collections of blinded candidate values;

choosing by a second party, for each signature to be issued by the second party, one of said candidate values from each of said collections received from said first party; and returning a digital signature on the product of each chosen candidate value by said second party to said first party; and checking said signature by said first party responsive to said candidate value chosen by said second party.

11. The method of claim 10, wherein the root under which each of said candidates appears corresponding with a public exponent associated with each of said collections from which a candidate is chosen.

12. The method of claim 10, further comprising the steps of forming by said second party of plural signatures of different selections from said collections of candidates received.

13. Apparatus for effecting public-key digital signatures, the apparatus comprising:

means for determining an exponent from a first message by a first party using a procedure known to the first party and to a second party, the exponent containing at least one prime factor uniquely determined by said message;

means for forming by said first party a root on a constant known to said first and second party, said root corresponding to said exponent;

means for communicating said root to said second party by said first party; and means for checking said root by said second party, including means for computing said exponent, for raising said root to said exponent to produce a result, and for verifying that the result is said constant.

14. Apparatus for effecting public-key digital signatures, the apparatus comprising:

means for determining, from a first message and a state variable, a set of exponents by a first party using a procedure known to the first party and a second party, the set of exponents containing at least one prime factor uniquely determined by said state variable and the set of exponents being different from every subset of a set corresponding to a different message;

means for forming by said first party of roots on a constant, the constant known to said first and second party, and the roots corresponding to at least the members of said set of exponents;

means for communicating said roots and said state variable to said second party by said first party; and means for checking said roots by said second party computing said set of exponents, raising said roots to the powers that are members of said set of exponents to produce a result, and verifying that the result is said constant.

15. Apparatus for showing and verifying public-key blind signatures by a first party to a second party, the apparatus comprising:

means for issuing a challenge by said second party to said first party that is unpredictable to said first party;

means for forming by said first party a response to said challenge that includes only roots and corresponding bases whose public exponents are indicated by said challenge and excludes roots and corresponding bases whose public exponents are not indicated by said challenge; and means for checking said response by said second party raising said response to said indicted powers to produce a result and verifying the result.

* * * * *